E. F. HOLLOWAY.
Churn.
No. 48,278.
Patented June 20, 1865.
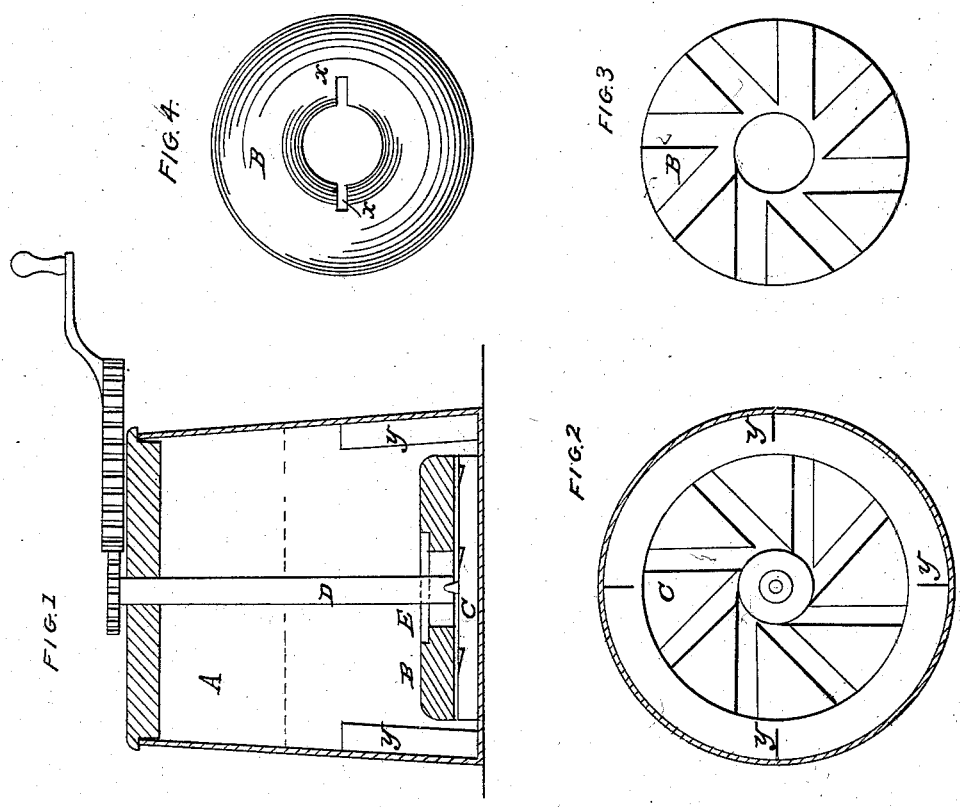

UNITED STATES PATENT OFFICE.

EDWD. F. HOLLOWAY, OF KNIGHTSTOWN, INDIANA.

IMPROVEMENT IN CHURNS.

Specification forming part of Letters Patent No. 48,278, dated June 20, 1865.

*To all whom it may concern:*

Be it known that I, EDWARD F. HOLLOWAY, of Knightstown, in the county of Henry and State of Indiana, have invented new and useful Improvements in Churns; and I do hereby declare that the following is a full and exact description thereof, reference being had to the accompanying drawings, making part of the same, and to the letters of reference marked thereon.

Figure 1 is a vertical section through the center of the churn. Fig. 2 is a horizontal section just above disk C. Fig. 3 is a view of disk B on the under side. Fig. 4 is a view of the upper side of disk B.

The nature of my invention consists in providing and arranging two disks similar to millstones in the bottom of a suitable vessel and operating them in such manner as more effectually to agitate the milk or cream, and to commingle air with it, so as more speedily and effectively to separate the butter-globules from the milk.

To enable others skilled in the art to make and use my invention, I will proceed to describe its construction and operation.

In the bottom of any suitable vessel, A, which is better to be shallow and of considerable diameter instead of the usual form, I fix permanently a grooved disk, C, which should be as thin as practicable. Over disk C and in contact with it is a movable or rotary disk, B, which is also grooved, as shown in Fig. 3. On the upper side of disk B are notches $x\ x$, Fig. 4, to receive the ends of arms E, by which the disk is rotated with the shaft D. Shaft D has its lower bearing on a pivot fixed in the center of disk C and its upper bearing in the cover of the vessel, and is provided with arms E near its lower end, which serve to drive disk B. Motion is given to the shaft and disk B by cog-wheels and crank or other convenient mode. The revolution of disk B should be tolerably rapid, which drives by centrifugal force the milk from between the disks and causes the milk above to be drawn down through the center opening in disk B, which is in turn acted upon in the same manner. Air is also drawn down with the milk, and they are thoroughly intermingled, which causes a more complete and speedier separation of the butter-globules from the milk. The butter floats to the surface and is gathered around the shaft.

Y are deflectors, which prevent the whole body of milk from acquiring a rotary motion with the disk B.

I am aware that similar grooved disks have been used before for the purpose of agitating the milk; but those have been placed at the top and do not accomplish the purpose so fully as by my arrangement.

I do not claim any of the parts shown separately; but

What I do claim, and desire to secure by Letters Patent, is—

The disks B and C, when constructed and arranged, as shown, at the bottom of vessel A and operating substantially in the manner described.

E. F. HOLLOWAY.

Witnesses:
THOMAS JAMES,
MILTON M. REEVES.